United States Patent Office 3,474,042
Patented Oct. 21, 1969

3,474,042
PROCESS FOR THE PRODUCTION OF CATALYSTS CONTAINING MOLYBDENUM AND/OR TUNGSTEN
Vittorio Fattore, Guido Petrini, and Enrico Cavaterra, Milan, Italy, assignors to Montecatini Edison S.p.A., Milan, Italy
No Drawing. Filed Dec. 20, 1966, Ser. No. 603,153
Claims priority, application Italy, Dec. 24, 1965, 28,596/65
Int. Cl. B01j *11/46*
U.S. Cl. 252—458                    6 Claims

ABSTRACT OF THE DISCLOSURE

A process for the preparation of catalysts comprised of molybdenum and/or tungsten by concentrating aqueous solutions of their peroxy compounds.

BACKGROUND OF THE INVENTION

The present invention relates to the production of catalysts, and, more particularly, to an improved process for the production of catalysts containing molybdenum and/or tungsten, as well as, whenever suitable, other elements.

Catalysts containing molybdenum and/or tungsten are widely used in many and diverse catalytic processes.

It is also known in the chemistry of molybdenum and tungsten that many of their salts with several metals are scarcely soluble and, owing to the frequent development of such compounds during the course of the production thereof, this phenomenon negatively affects production of such catalysts.

In particular, suspensions or slurries are encountered which do not permit proper carrying out of drying operations, mainly according to the so-called "spray drying" technique, either of the slurry, as such, or when the same is mixed with the sol of the chosen carrier, and above all such phenomena render the production of catalysts extremely difficult, as well as incapable of reproduction via the technique of impregnation of a preformed carrier.

As a matter of fact slurries are in the long run unstable and continuous stirring is necessary for their preservation, further, a progressive enlargement of the particles building up the solid phase cannot be avoided. These effects, consequently, cause many practical drawbacks.

As to the catalysts obtained via the impregnation technique of a performed carrier, an "unmixing" effect occurs between the solid and the liquid phases, as the smaller pores will be almost exclusively reached by the components in liquid phase, while solid phases will preferentially deposit in the larger pores.

There is a possibility of overcoming such drawbacks by carrying out repeated impregnations. This process is, however, burdensome and unsuited to solve the problem fully, as when performing the impregnation, which gives rise to precipitation, said precipitate can occlude some pores of the catalyst consequently impeding full impregnation homogeneity.

This invention provides a method for the preparation of catalysts containing molybdenum and/or tungsten, as well as other elements, when suitable, suited to fully eliminate the above specified drawbacks.

THE INVENTION

The method, according to this invention, comprises the preparation of said catalysts starting from solutions containing molybdenum and/or tungsten in the form of peroxymolybdic and/or peroxytungstic compounds.

Said solutions containing molybdenum and/or tungsten in the form of peroxymolybdic compounds and/or peroxytungstic compounds are obtained by treating compounds of molybdenum and/or tungsten with hydrogen peroxide or compounds producing hydrogen peroxide.

The compounds of the other elements, if used in the catalytic system according to the present invention, can be added during the treatment with the hydrogen peroxide or subsequent thereto.

Examples of such other elements are: nickel, cobalt, bismuth, cerium, manganese, zirconium, tellurium, lanthanum, iron, copper.

The process according to this invention permits one to work with clear and stable solutions with comparatively higher concentrations of molybdenum and/or tungsten, and particularly permits one to operate in the contemporaneous presence of all other possible elements of the catalysts, while no precipitate appears.

The possibility of working with more concentrated solutions not only involves obvious advantages, as, for example, a reduction in the quantity of liquid to be evaporated during the drying treatment, but also affords a peculiar, essential advantage in case the catalysts are prepared by the impregnation technique. It is known that a correct impregnation requires a quantity of solution of active components equal to the total volume of the pores in the carrier; the increased salt concentration of the impregnating solution permits one to obtain by only a single impregnation a catalyst with higher concentrations of active elements.

Various compounds of molybdenum can be used in the practical application of this invention, but the compounds most commonly used for producing said catalysts are ammonium molybdates (as, for example, paramolybdate and molybdate, most common commercially), molybdates of alkaline metals, molybdic acid and molybdic anhydride.

Likewise, as to tungsten, ammonium metatungstate and paratungstate, metatungstate and paratungstates of alkaline metals, metatungstatic acid, paratungstic acid, tungstic anhydride, etc. may be used.

Suitably diluted hydrogen peroxide is gradually added to the molybdenum and/or tungsten compound, either as such or as an aqueous solution or suspension.

While carrying out this addition, it is convenient to stir and to cool the entire mass according to the known techniques.

Cooling is generally necessary to dissipate the heat developed by the reaction of the hydrogen peroxide with the molybdic and/or tungstic compound: should this heat not be dissipated, under particular reaction conditions (e.g., shape and size of the reactor, concentration of the reagents, reaction time), the solution could reach such a temperature as to permit the decomposition velocity of the hydrogen peroxide to become higher than its reaction velocity with the molybdic or tungstic compound.

The quantity of hydrogen peroxide used with respect to the molybdenum and/or tungsten is such that the molar ratios $H_2O_2:MoO_3$ and $H_2O_2:WO_3$ are comprised within the range of from about 0.25 to 10, but preferably in the range of from 1 to 3.

The quantity of hydrogen peroxide to be used obviously depends on the reaction conditions, but mainly on the cooling effectiveness of the reaction room and on the desired reaction time.

All types of commercial hydrogen peroxide are suitable for carrying out the process according to this invention, but hydrogen peroxide in aqueous solution at 35% (120 volumes) is particularly suitable for this purpose.

The solutions of the other compounds which, together with molybdenum and/or tungsten, make up the catalyst, are preferably prepared separately and subsequently mixed with the peroxymolybdic and/or peroxytungstic solution in the same manner as required for a molybdic and/or tungstic solution. Unlike these latter solutions, the use of peroxymolybdic and/or peroxytungstic solutions does not give rise to solid precipitates.

The preparation of the catalyst in carried out according to operations of usual techniques, which include "spray-drying" or impregnation, drying, activation, etc.

The process of the present invention can be applied to the production of any catalyst comprising molybdenum and/or tungsten. This process proved, for example, to be useful for producing the complex catalysts described in the Italian patent application No. 13,163/61 relating to the synthesis of unsaturated nitriles via ammoxidation of olefins.

In order to further illustrate the present invention and the advantages thereof, the following specific examples are given, it being understood that the same are merely intended to be illustrative and not limitative.

Example 1

1796 g. of ammonium paramolybdate $$[(NH_4)_6Mo_7O_{24}\cdot 4H_2O]$$

were dissolved in 860 cc. of distilled water and 860 cc. of hydrogen peroxide titred 35% (120 volumes).

The addition of hydrogen peroxide was carried out slowly while cooling the container of molybdenum salt. The temperature was kept below 35° C.

Separately, 3730 g. of $Bi(NO_3)_3\cdot 5H_2O$ and 367 g. of $$Ce(NO_3)_3\cdot 6H_2O$$

were dissolved in 1500 cc. of distilled water and 860 cc. of concentrated nitric acid (65%).

The peroxymolybdic solution was then slowly added to the bismuth and cerium nitrate solution under continuous stirring. The solution obtained was thereupon diluted with water until reaching a volume equal to the total volume of the pores in the carrier to be impregnated. 6600 g. of commercial microspheroidal silica were impregnated with said diluted solution.

The product obtained was dried in air for 12 hours in an oven heated to 110° C.–120° C. Activation in air at 540° C. followed in an oven for a duration of 3 hours.

Through chemical analysis the composition of the catalyst was: $Bi_2O_3=18\%$, $CeO_2=1.45\%$, $MoO_3=14.8\%$, $SiO_2=65.8\%$.

Example 2

21 g. of ammonium paramolybdate were dissolved in 10 cc. of distilled water and 10 cc. of hydrogen peroxide at 35% (120 volumes), the same cares as specified in Example 1 having been taken.

Separately a solution was prepared by adding to 132 g. of commercial silica sol (titred 30% $SiO_2$) and in the following order, 20 g. of $HNO_3$ titred 55%, 43.6 g. of $$Bi(NO_3)_3\cdot 5H_2O$$

and 4.3 g. of $Ce(NO_3)_3\cdot 6H_2O$.

The entire mass was stirred until all salts were dissolved, and thereto the solution of peroxymolybdate was slowly added.

The resulting solution was conveyed to a spray-dryer to be atomized and dried at the same time, so as to obtain a microspheroidal catalyst. Said catalyst was then discharged from the spray-dryer and activated in an oven, in the presence of air, at 540° C. and for 8 hours.

Chemically analyzed, the composition of the catalyst obtained was $Bi_2O_3=26.3\%$, $CeO_2=2.2\%$, $$MoO_3=21.8\%$$

$SiO_2=49.7\%$.

Example 3

42.32 g. of $(NH_4)_6Mo_7O_{24}\cdot 4H_2O$ were dissolved in 60 cc. of $H_2O_2$ at 40 volumes. A separate solution was prepared as follows: 264 g. of a colloidal silica solution with a 30% $SiO_2$ content were acidified by means of 40 g. of nitric acid concentrated at 65% and subsequently 87.3 g. of $Bi(NO_3)_3\cdot 5H_2O$, as well as 6.78 g. of $$Zr(NO_3)_4$$

were added. The entire mass was stirred until the salts were fully dissolved, thereupon the solution of peroxymolybdate was slowly added to the resulting solution.

The final solution obtained was then conveyed to a spray-dryer and the microspheroidal product thus obtained was activated in air, at 540° C., for 8 hours.

The catalyst had the following chemical composition: $Bi_2O_3=26.4\%$, $ZrO_2=1.55\%$, $MoO_3=22.2\%$, $$SiO_2=49.7\%$$

Example 4

30 g. of $(NH_4)_6Mo_7O_{24}\cdot 4H_2O$ were dissolved in 10 cc. of $H_2O_2$ (120 volumes) and 15 cc. of $H_2O$. A separate solution was thereafter prepared by acidifying 127 g. of a colloidal silica solution with a 30% $SiO_2$ content by means of 15 g. of $HNO_3$ titred 65%. 3.24 g. of $$H_2TeO_4\cdot 2H_2O$$

and 30.8 g. of $Ce(NO_3)_3\cdot 6H_2O$ were subsequently added thereto.

After the salts were fully dissolved, the solution of peroxymolybdate was slowly added.

The solution obtained was conveyed to a spray-dryer and the resulting microspheroidal product was activated in air current at 540° C., for 8 hours.

Chemically analyzed, the catalyst showed the following composition: $MoO_3=32.2\%$, $CeO_2=15.7\%$, $TeO_2=2.9\%$, $SiO_2=49.2\%$.

Example 5

19.2 g. of $(NH_4)_6Mo_7O_{24}\cdot 4H_2O$ were dissolved in 15 cc. of $H_2O$ and 10 cc. of $H_2O_2$ (at 120 volumes). A separate solution was thereafter prepared by dissolving 2.06 g. of $H_2TeO_4\cdot 2H_2O$ and 19.7 g. of $Ce(NO_3)_3\cdot 6H_2O$ in 25 cc. of water and 9.6 g. of $HNO_3$ titred 65%.

The solution of peroxymolybdate was subsequently poured slowly into the obtained solution of telluric acid and cerium nitrate.

The solution obtained was diluted with water up to a volume equal to the total volume of the silica carrier pores and 75.6 g. of commercial microspheroidal silica were impregnated with said diluted solution. The resulting product was dried for 12 hours at 110° C.–120° C. and subsequently activated in air for 8 hours, at 600° C.

Through chemical analysis, the catalyst showed the following composition: $MoO_3=15.9\%$, $CeO_2=7.8\%$, $TeO_2=1.4\%$, $SiO_2=75.6\%$.

Example 6

192 g. of $(NH_4)_6Mo_7O_{24}\cdot 4H_2O$ were dissolved in 120 cc. of $H_2O$ and 80 cc. of $H_2O_2$ at 120 volumes.

A separate solution was thereafter prepared by dissolving 81.6 g. of $H_2TeO_4\cdot 2H_2O$ and 197 g. of $$Ce(NO_3)_3\cdot 6H_2O$$

in 450 cc. of $H_2O$ and 96 g. of $HNO_3$ titred 65%.

The solution of peroxymolybdate was subsequently slowly poured into the above obtained solution of telluric acid and cerium nitrate.

The resulting solution was diluted with water up to a volume equal to the total volume of the carrier pores and 845 g. of commercial microspheroidal silica were impregnated with said diluted solution.

The resulting product was dried for 12 hours at 110° C.–120° C. and subsequently activated in air for 8 hours, at 530° C.

Through chemical analysis, the catalyst showed the following composition: $TeO_2 = 5\%$, $CeO_2 = 6.9\%$, $MoO_3 = 13.7\%$, $SiO_2 = 74.5\%$.

Example 7

84.5 g. of $Al_2O_3$ of a commercial microspheroidal type were impregnated with a catalyst, the same as specified in Example 6.

Through chemical analysis, the catalyst showed the following composition: $TeO_2 = 5\%$, $CeO_2 = 6.9\%$, $MoO_3 = 13.7\%$, $Al_2O_3 = 74.5\%$.

Example 8

84.5 g. of $Al_2O_3$ of the Alcoa F-110 type in the form of ¼ in. spheres were impregnated with a catalyst, the same specified in Example 6.

Through chemical analysis, the catalyst showed the following composition: $TeO_2 = 5\%$, $CeO_2 = 6.9\%$, $MoO_3 = 13.7\%$, $Al_2O_3 = 74.5\%$.

Example 9

19.2 g. of $(NH_4)_6Mo_7O_{24} \cdot 4H_2O$ were dissolved in 20 cc. of $H_2O_2$ at 40 volumes.

A separate solution was thereafter prepared as follows: 96 g. of silica sol with 30% $SiO_2$ were acidified by means of 10 g. of $HNO_3$ titred 65%.

8.16 g. of $H_2Te_4 \cdot 2H_2O$, as well as 19.7 g. of $Ce(NO_3)_3 \cdot 6H_2O$ were added to the acidified solution.

The entire mass was stirred until the salts were fully dissolved and the solution of peroxymolybdate was then slowly added to the resultant solution.

The final solution was used to feed a spray-dryer. The obtained microspheroidal product was activated in air, at 530° C., for 8 hours.

Through chemical analysis, the catalyst showed the following composition: $TeO_2 = 9.8\%$, $CeO_2 = 13.5\%$, $MoO_3 = 26.9\%$, $SiO_2 = 49.8\%$.

Example 10

19.2 g. of $(NH_4)_6Mo_7O_{24} \cdot 4H_2O$ were dissolved in 6.5 cc. of $H_2O$ and 6.5 cc. of $H_2O_2$ at 35% (120 volumes.) A separate solution was thereafter prepared by mixing 8.16 g. of $H_2TeO_4 \cdot 2H_2O$ and 25.8 g. of 50% $Mn(NO_3)_2$ solution with 9.6 g. of $HNO_3$ titred 65% and 15 cc. of water.

The peroxymolybdate solution was then poured into the above obtained solution containing manganese and tellurium.

The final solution was diluted with water up to a volume equal to the total volume of the silica carrier pores, and 78.8 g. of a commercial microspheroidal silica were impregnated therewith.

The product obtained was dried for 12 hours at 110° C.–120° C. and afterwards activated in air for 8 hours, at 525° C.

Through chemical analysis, the catalyst showed the following composition: $TeO_2 = 5.4\%$, $MnO = 4.9\%$, $MoO_3 = 14.7\%$, $SiO_2 = 75\%$.

Example 11

19.2 g. of $(NH_4)_6Mo_7O_{24} \cdot 4H_2O$ were dissolved in 15 cc. of $H_2O_2$ at 30%. A separate solution was prepared by mixing 16.3 g. of $H_2TeO_4 \cdot 2H_2O$ and 19.7 g. of $Ce(NO_3)_3 \cdot 6H_2O$ with 65 cc. of $H_2O$ and 9.6 g. of $HNO_3$ titred 65%. The peroxymolybdate solution was then poured into the above obtained solution containing cerium and tellurium.

The resulting solution was diluted with water up to a volume equal to the total volume of the carrier pores and 108 g. of commercial microspheroidal silica were impregnated therewith. The obtained product was dried for 12 hours at 110° C.–120° C. and subsequently activated at 500° C. in air for 8 hours.

Through chemical analysis, the catalyst showed the following composition: $TeO_2 = 7.95\%$, $CeO_2 = 5.47\%$, $MoO_3 = 10.9\%$, $SiO_2 = 75.6\%$.

Example 12

19.2 g. of $(NH_4)_6Mo_7O_{24} \cdot 4H_2O$ were dissolved in 6.5 cc. of water and 10 cc. of $H_2O_2$ at 35%. A separate solution was thereafter prepared by mixing 8.16 g. of

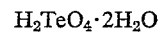
$H_2TeO_4 \cdot 2H_2O$ and 13.5 g. of $Co(NO_3)_2 \cdot 6H_2O$ with 45 cc. of water and 9.6 g. of $HNO_3$ titred 65%. The solution of peroxymolybdate was subsequently poured into the above obtained solution containing tellurium and cobalt. The resulting solution was diluted with water up to a volume equal to the total volume of the carrier pores and 75.4 g. of commercial microspheroidal silica were impregnated therewith. The obtained product was dried for 12 hours at 110° C.–120° C. and subsequently activated in air for 8 hours, at 500° C.

Through chemical analysis, the catalyst showed the following composition: $TeO_2 = 5.7\%$, $CoO = 3.4\%$, $MoO_3 = 15.5\%$, $SiO_2 = 75.4\%$.

Example 13

19.2 g. of $(NH_4)_6Mo_7O_{24} \cdot 4H_2O$ were dissolved in 6.5 cc. of $H_2O$ and 6.5 cc. of $H_2O_2$ at 35%. A separate solution was thereafter prepared by mixing 8.16 g. of $H_2TeO_4 \cdot 2H_2O$ and 13.4 g. of $Ni(NO_3)_2 \cdot 6H_2O$ with 45 cc. of $H_2O$ and 9.6 g. of $HNO_3$ titred 65%.

The solution of peroxymolydate was subsequently poured into the above obtained solution containing tellurium and nickel. The resulting solution was diluted with water up to a volume equal to the total volume of the carrier pores and 75.4 g. of commercial microspheroidal silica were impregnated therewith.

The obtained product was dried for 12 hours at 110° C.–120° C. and subsequently activated in air for 8 hours, at 500° C.

Through chemical analysis, the catalyst showed the following composition: $TeO_2 = 5.7\%$, $NiO = 3.4\%$, $MoO_3 = 15.55\%$, $SiO_2 = 75.4\%$.

Example 14

20 g. of $5(NH_4)_2O \cdot 12WO_3 \cdot 5H_2O$ were dissolved in 30 cc. of $H_2O_2$ at 35% (120 volumes). A separate solution was perpared by dissolving 5.9 g. of $H_2TeO_4 \cdot 2H_2O$ and 13.9 g. of $Ce(NO_3)_3 \cdot 6H_2O$ in 40 cc. of $H_2O$ and 9 g. of $HNO_3$ titred 65%.

The solution of tungsten salt was then poured into the above obtained solution containing tellurium and cerium. The resulting solution was diluted with water up to a volume equal to the total volume of the carrier pores and 82.6 g. of commercial microspheroidal silica were impregnated therewith.

The product obtained was dried for 12 hours at 110° C.–120° C. and subsequently activated in air for 8 hours, at 550° C.

Through chemical analysis, the catalyst showed the following composition $WO_3 = 16.2\%$, $CeO_2 = 5\%$, $TeO_2 = 3.71\%$, $SiO_2 = 75\%$.

Example 15

20 g. of $5(NH_4)_2O \cdot 12WO_3 \cdot 5H_2O$ were dissolved in 20 cc. of $H_2O_2$ at 35% (120 volumes) and 15 cc. of water.

A separate solution was thereafter prepared by dissolving 28.9 g. of $Bi(NO_3)_3 \cdot 5H_2O$ and 2.77 g. of

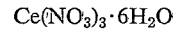
$Ce(NO_3)_3 \cdot 6H_2O$ in 11 g. of $HNO_3$ titred 65% and 20 cc. of water.

The tungsten salt solution was then poured into the above obtained solution containing bismuth and cerium.

The resulting solution was diluted with $HNO_3$ titred 15% up to a volume equal to the total volume of the carrier pores and 103 g. of commercial microspheroidal silica were impregnated therewith.

The product obtained was dried for 12 hours at 110° C.–120° C. and subsequently activated in air for 8 hours, at 540° C.

Through chemical analysis, the catalyst showed the following composition: $WO_3=13\%$, $CeO_2=0.8\%$, $Bi_2O_3=9.8\%$, $SiO_2=75\%$.

As many apparently widely different embodiments of the present invention can be made without departing from the spirit and scope thereof, it is to be understood that the same is not intended to be limited to the specific embodiments thereof, except as defined in the appended claims.

What is claimed is:

1. In a process for the preparation of catalysts comprised of molybdenum or tungsten or mixtures thereof, the improvement comprising forming a clear, stable aqueous solution of a compound selected from the group consisting of a peroxy molybdenum compound, a peroxy tungsten compound, and mixtures thereof by dissolving a compound a selected from the group consisting of a molybdic compound, a tunstenic compound and mixtures thereof in water and hydrogen peroxide, and thereafter combining said solution with a material for forming a catalyst support in the final catalytic product.

2. In a process according to claim 1, further comprising concentrating said solution by spray drying.

3. In a process according to claim 1, wherein said material which is mixed with said solution is a sol of a suitable catalyst support, and further comprising drying said solution and said sol.

4. In a process according to claim 1, wherein said material is impregnated with said solution and thereafter dried.

5. In a process according to claim 4, wherein said material is microspheroidal silica.

6. In a process according to claim 1, further comprising mixing said solution with a solution of at least one compound of a catalytic element selected from the group consisting of nickel, cobalt, bismuth, cerium, manganese, irconuim, tellurium, lanthanum, iron, and copper.

References Cited

UNITED STATES PATENTS

| | | | |
|---|---|---|---|
| 1,896,055 | 1/1933 | Patrick et al. | 252—458 X |
| 2,895,920 | 7/1959 | Janoski | 252—467 X |
| 3,135,807 | 6/1964 | Grasselli et al. | 252—467 X |
| 3,182,048 | 5/1965 | Mills | 252—467 X |
| 3,243,462 | 3/1966 | Smith | 252—467 X |

DANIEL E. WYMAN, Primary Examiner

C. F. DEES, Assistant Examiner

U.S. Cl. X.R.

252—454, 455, 456, 458, 459, 467